(12) United States Patent
Yoshida

(10) Patent No.: US 7,529,419 B2
(45) Date of Patent: May 5, 2009

(54) DATA PROCESSING DEVICE CAPABLE OF PROCESSING IMAGE DATA WITH SMALL MEMORY CAPACITY, IMAGE PROCESSING METHOD, AND PROGRAM PRODUCT

(75) Inventor: Hiroki Yoshida, Takatsuki (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 684 days.

(21) Appl. No.: 11/305,559

(22) Filed: Dec. 16, 2005

(65) Prior Publication Data
US 2006/0133679 A1 Jun. 22, 2006

(30) Foreign Application Priority Data
Dec. 21, 2004 (JP) ............................. 2004-369070

(51) Int. Cl.
*G06K 9/36* (2006.01)
*G06K 9/46* (2006.01)
*G06K 9/66* (2006.01)
(52) U.S. Cl. .................. 382/239; 382/166; 382/190
(58) Field of Classification Search ................. 382/166, 382/167, 170, 190, 239; 348/390.1
See application file for complete search history.

(56) References Cited

U.S. PATENT DOCUMENTS

| 5,991,515 | A  | * | 11/1999 | Fall et al. ................... 358/1.15 |
| 6,151,420 | A  | * | 11/2000 | Wober et al. ................. 382/275 |
| 6,331,860 | B1 | * | 12/2001 | Knox .......................... 345/620 |
| 6,454,410 | B1 | * | 9/2002  | Berger et al. ................ 351/206 |
| 7,293,712 | B2 | * | 11/2007 | Wang ..................... 235/462.01 |
| 2004/0037476 | A1 | * | 2/2004 | Chen .......................... 382/284 |
| 2004/0252884 | A1 | * | 12/2004 | Foote et al. ................. 382/162 |
| 2005/0169555 | A1 | * | 8/2005 | Hasegawa .................... 382/284 |

FOREIGN PATENT DOCUMENTS

| JP | 5-135202 | A |   | 6/1993 |
| JP | 2000022943 | A | * | 1/2000 |

\* cited by examiner

*Primary Examiner*—Yubin Hung
(74) *Attorney, Agent, or Firm*—Sidley Austin LLP

(57) ABSTRACT

In an image processing device, image data is divided into a plurality of band data including first and second band data. The first band data and the second band data have an overlap region, from which the first and second regions are extracted, respectively. The first region and the second region at least partially overlap with each other in the overlap region and have attributes different from each other, and the respective feature amounts are calculated. Based on these feature amounts, an attribute to be used for correction is decided. Then, an attribute different from the decided attribute between the attribute of the first region and the attribute of the second region is changed to the decided attribute.

18 Claims, 8 Drawing Sheets

F I G. 4
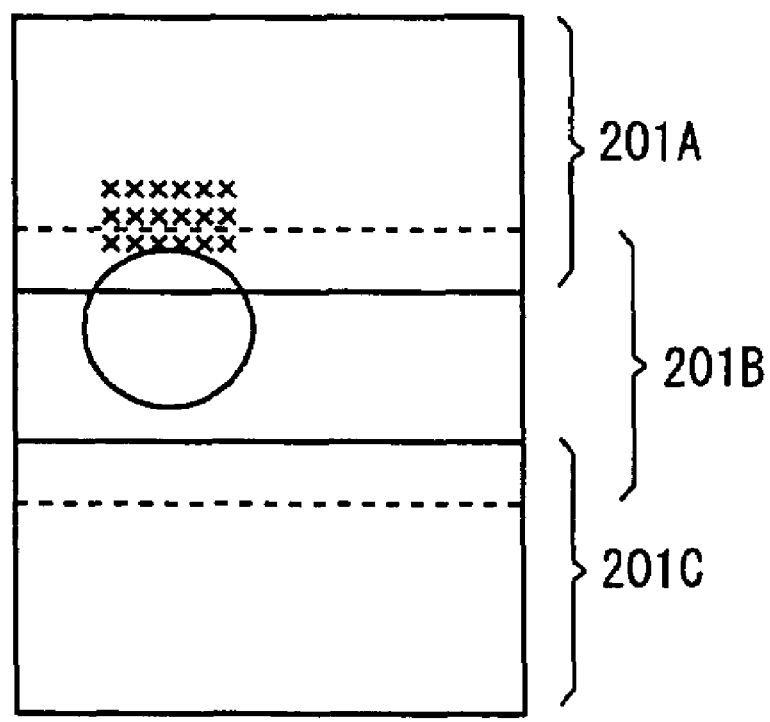

| ATTRIBUTE | FIRST WEIGHTING COEFFICIENT Coef |
|---|---|
| PHOTOGRAPH | 100 |
| GRAPHICS | 1 |
| CHARACTER | 10 |

| ATTRIBUTE | SECOND WEIGHTING COEFFICIENT Weight | |
|---|---|---|
| | OVERLAPPING WIDTH : SMALL | OVERLAPPING WIDTH : LARGE |
| PHOTOGRAPH | 1 | 0.2 |
| GRAPHICS | 1 | 1 |
| CHARACTER | 1 | 0.2 |

DATA PROCESSING DEVICE CAPABLE OF PROCESSING IMAGE DATA WITH SMALL MEMORY CAPACITY, IMAGE PROCESSING METHOD, AND PROGRAM PRODUCT

This application is based on Japanese Patent Application No. 2004-369070 filed with the Japan Patent Office on Dec. 21, 2004, the entire content of which is hereby incorporated by reference.

BACKGROUND OF THE INVENTION

1. Field of the Invention

The present invention relates to an image processing device, an image processing method, and a program product. More specifically, the present invention relates to an image processing device suitable for compressing and encoding image data, an image processing method, and a program product.

2. Description of the Related Art

Conventionally, in order to improve compression efficiency during compression and encoding of image data, each attribute region of character, photograph, and graphics is extracted from the image data, and compression and encoding is performed for each attribute region. A technique for identifying an attribute of an image from image data and extracting an attribute region is disclosed, for example, in Japanese Laid-Open Patent Publication No. 05-135202.

On the other hand, a region having a character attribute representing a character is desirably binarized for compression and encoding. A dedicated hardware circuit is often used to increase the processing speed of this binarization. In the dedicated hardware circuit, a memory having a relatively small capacity is used to reduce the device costs, and image data is divided into band data and then binarized. In the hardware circuit for this binarization, when a photograph attribute representing a photograph and a graphics attribute representing graphics are processed according to the band data as a processing unit, the precision for identifying a region is unfortunately degraded. Image data is divided into band data depending on the amount of data, irrespective of the contents of the image data, so that a character, a photograph or graphics may sometimes be divided into a plurality of band data. Therefore, in some cases, for example, while a character is identified as a character in one band data, the character may not be identified as a character in the other band data. If the attribute of a region is mistakenly identified, the compression efficiency decreases.

SUMMARY OF THE INVENTION

The present invention is made to solve the aforementioned problem, and an object of the present invention is to provide an image processing device capable of accurately identifying an attribute of an image with a small memory capacity, an image processing method, and an image processing program.

Another object of the present invention is to provide an image processing device, an image processing method, and an image processing program in which an image is less degraded in compression of image data.

An image processing device in accordance with the present invention includes: a division unit dividing image data into a plurality of band data in such a manner as to have an overlap region where adjacent band data overlap with each other; and a region identification unit extracting a region from each of the plurality of band data for each of different kinds of attributes. The plurality of band data includes first band data and second band data having the overlap region. The image processing further includes a region extractor extracting a first region from the region extracted from the first band data and extracting a second region from the region extracted from the second band data. The first region and the second region at least partially overlap with each other in the overlap region and have attributes different from each other. The image processing device further includes: a first feature amount calculator calculating a feature amount of the extracted first region; a second feature amount calculator calculating a feature amount of the extracted second region; an attribute decision unit deciding on any one of an attribute of the first region and an attribute of the second region for use in correction, based on the feature amount of the first region and the feature amount of the second region; and a correction unit changing an attribute different from the decided attribute, of the attribute of the first region and the attribute of the second region, to the decided attribute.

Preferably, in the image processing device in accordance with the present invention, the first feature amount calculator includes a first generator generating a histogram based on a pixel value of a pixel included in the first region of the image data and calculates the first feature amount based on the number of peak values of the generated histogram. The second feature amount calculator includes a second generator generating a histogram based on a pixel value of a pixel included in the second region of the image data and calculates the second feature amount based on the number of peak values of the generated histogram.

Preferably, in the image processing device in accordance with the present invention, the attribute decision unit further includes a comparison unit multiplying each of the feature amount of the first region and the feature amount of the second region by a first weighting coefficient predetermined according to an attribute to compare values resulting from the multiplication.

Preferably, in the image processing device in accordance with the present invention, the comparison unit further multiplies each of the feature amount of the first region and the feature amount of the second region by a second weighting coefficient predetermined according to a width of the overlap region for each attribute to compare values resulting from the multiplication.

Preferably, in the image processing device in accordance with the present invention, the attribute decision unit includes a third weighting coefficient decision unit deciding a third weighting coefficient according to a ratio between the first region and a region where the first region is included in the overlap region, and a fourth weighting coefficient decision unit deciding a fourth weighting coefficient according to a ratio between the second region and a region where the second region is included in the overlap region. The comparison unit compares a value obtained by further multiplying the feature amount of the first region by the third weighting coefficient with a value obtained by further multiplying the feature amount of the second region by the fourth weighting coefficient.

Preferably, the image processing device in accordance with the present invention further includes: an integration unit receiving the regions extracted for each attribute to integrate two regions among received the regions that have a same attribute and overlap with each other in the overlap region; and a compression unit compressing and encoding the image data in a compression format predetermined corresponding to an attribute for each of a region integrated by the integration unit and a region that is not integrated by the integration unit.

An image processing method in accordance with the present invention includes the steps of: dividing image data into a plurality of band data in such a manner as to have an overlap region where adjacent band data overlap with each other; and extracting a region from each of the plurality of band data for each of different kinds of attributes. The plurality of band data including first band data and second band data having the overlap region. The image processing method further includes the step of extracting a first region from the region extracted from the first band data and extracting a second region from the region extracted from the second band data. The first region and the second region at least partially overlap with each other in the overlap region and have attributes different from each other. The image processing method further includes the steps of; calculating a feature amount of the extracted first region; calculating a feature amount of the extracted second region; deciding on any one of an attribute of the first region and an attribute of the second region based on the feature amount of the first region and the feature amount of the second region; and changing an attribute different from the decided attribute, of the attribute of the first region and the attribute of the second region, to the decided attribute.

A program product in accordance with the present invention causes a computer to execute image processing. The computer is caused to execute the steps of: dividing image data into a plurality of band data in such a manner as to have an overlap region where adjacent band data overlap with each other; and extracting a region from each of the plurality of band data for each of different kinds of attributes. The plurality of band data includes first band data and second band data having the overlap region. The computer is caused to further execute the step of extracting a first region from the region extracted from the first band data and extracting a second region from the region extracted from the second band data. The first region and the second region at least partially overlap with each other in the overlap region and have attributes different from each other. The computer is caused to further execute the steps of, calculating a feature amount of the extracted first region; calculating a feature amount of the extracted second region; deciding on any one of an attribute of the first region and an attribute of the second region based on the feature amount of the first region and the feature amount of the second region; and changing an attribute different from the decided attribute, of the attribute of the first region and the attribute of the second region, to the decided attribute.

In accordance with the present invention, after image data is divided into a plurality of band data, an attribute region is extracted from each band data. Accordingly, image data can be processed with a small memory capacity.

Furthermore; in accordance with the present invention, two attribute regions are extracted which are included in different band data, include an overlap region, and have attributes different from each other. Then, based on the feature amounts of the two attribute regions, one of the attributes of the two attribute regions is decided on. In other words, one of the attributes of two regions is decided on when the two regions are identified as having different attributes between the first band data and the second band data while they are different in the overlap region. As a result, it is possible to provide an image processing device capable of accurately identifying an attribute of an image with a small memory capacity.

In addition, in accordance with the present invention, it becomes possible to compress image data with less degradation of image quality since compression is performed in a compression format suitable for an attribute for each attribute region.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a diagram showing exemplary band data processed in MFP in FIG. 1.

DESCRIPTION OF THE PREFERRED EMBODIMENT

Figure 1:
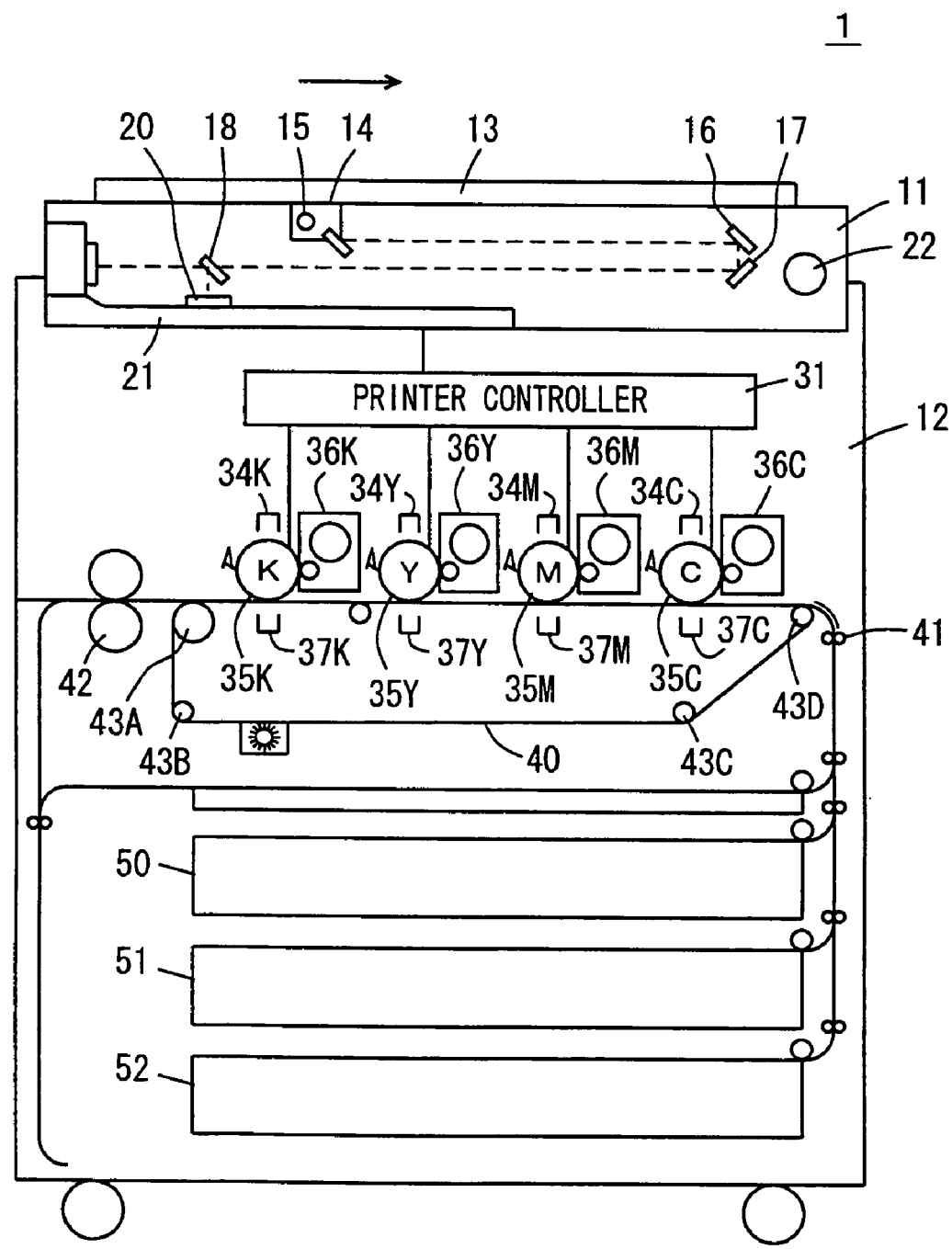
FIG. 1 is a schematic cross-sectional view showing a general configuration of MFP (Multi Function Peripherals) in an embodiment of the present invention.

In the following, an embodiment of the present invention will be described with reference to the figures. In the following description, the same parts will be denoted with the same reference characters. The designations and functions are also the same. Therefore, the detail description thereof will not be repeated.

First, a configuration of MFP as an embodiment of the present invention will generally be described.

Referring to FIG. 1, MFP 1 includes a scanner unit 11 for reading image data from a document and a printer unit 12 for printing an image on paper.

A document placed on a document glass 13 of scanner unit 11 is irradiated by an exposure lamp 15 included in a scanner 14. Scanner 14 moves in the direction indicated by the arrow using a scanner motor 22 to scan the entire document. The reflected light from a document surface forms an image on a CCD (Charge Coupled Device) 20 through mirrors 16-18 and a collective lens. CCD 20 converts the reflected light from the document surface to color data of RGB (analog signal), which is output to a scanner controller 21. The color data output by CCD 20 to scanner controller 21 is referred to as image data.

Scanner controller 21 performs prescribed image processing on the image data input from CCD 20 and outputs a digital signal to a printer controller 31.

Here, the digital signal output from scanner controller 21 to printer controller 31 includes image color data C for cyan, image color data M for magenta, image color data Y for yellow, and image color data K for black. Printer controller 31 outputs laser beams to photoconductor drums 35C, 35M, 35Y, 35K for cyan, magenta, yellow, and black, respectively, based on the input image color data C, M, Y, K.

In printer unit 12, the laser beams output from scanner controller 21 expose photoconductor drums 35C, 35M, 35Y, 35K charged by charging chargers 34C, 34M, 34Y, 34K to form latent images. Developing units 36C, 36M, 36Y, 36K of four colors of cyan, magenta, yellow, and black develop the latent images on photoconductor drums 35C, 35M, 35Y, 35K.

On the other hand, an endless belt 40 is suspended by a driving roller 43A and fixed rollers 43B, 43C, 43D so as not to loosen. When driving roller 43A rotates counterclockwise in the figure, endless belt 40 rotates counterclockwise in the figure at a prescribed speed.

Paper-feeding cassettes 50-52 allow adequate paper to be conveyed so that the paper is supplied from a timing roller 41 to endless belt 40. The paper supplied to endless belt 40 is carried on endless belt 40 and conveyed leftward in the figure. Accordingly, the paper is brought into contact with photoconductor drums 35C, 35M, 35Y, 35K in the order of cyan, magenta, yellow, and black. When the paper comes into contact with each of photoconductor drums 35C, 35M, 35Y, 35K, transfer chargers 37C, 37M, 37Y, 37K, which are paired with the photoconductor drums, allow toner images developed on the photoconductor drums to be transferred on the paper.

The paper on which the toner images are transferred is heated by a fixing roller pair 42. Toner is then melted and fixed on the paper. The paper is thereafter discharged from printer unit 12.

MFP 1 further includes a network controller, a facsimile, and a hard disk for communicating any other device connected to a network and has an email reception/transmission function, a file transfer function, a facsimile reception/transmission function, a print function of printing data, and a file accumulation function, in addition to the image reading function and the image forming function as described above.

A circuit configuration of MFP in the present embodiment will now be described.

Figure 2:
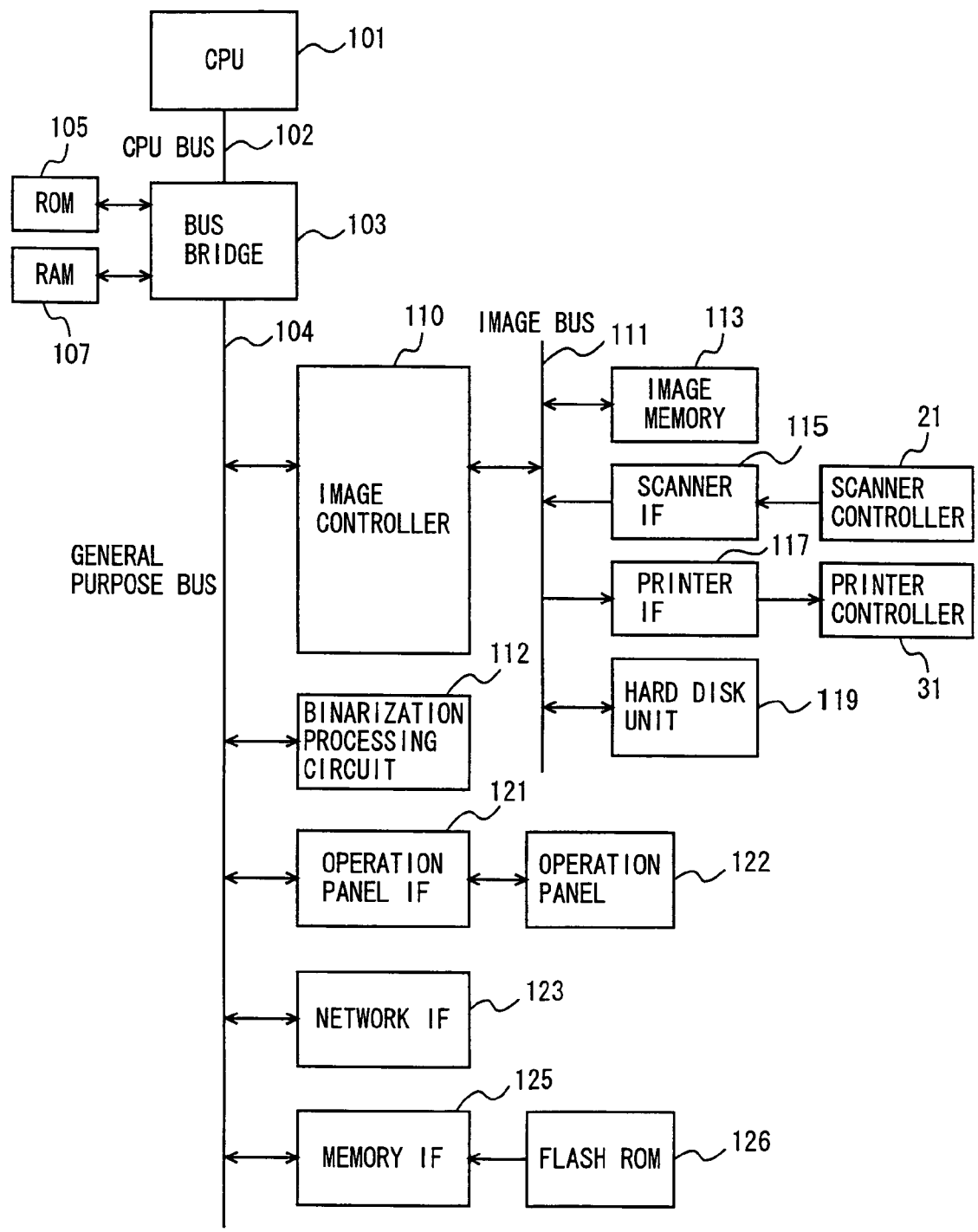
FIG. 2 is a block diagram showing a circuit configuration of MFP in FIG. 1.

Referring to FIG. 2, MFP 1 includes a CPU 101 for controlling the entire MFP 1, a bus bridge 103 connected to CPU 101 through a CPU bus 102, an ROM (Read Only Memory) 105 and an RAM (Random Access Memory) 107 connected to bus bridge 103, and an image controller 110, a binarization processing circuit 112, an operation panel interface (IF) 121, a network interface (IF) 123, and a memory interface (IF) 125 each connected to bus bridge 103 through a general purpose bus 104.

Operation panel IF 121 is connected to an operation panel 122. Network IF 123 is connected to a network. A flash ROM 126 can be attached to memory IF 125.

Connected to image controller 110 through an image bus 111 are an image memory 113, a scanner interface (IF) 115, a printer interface (IF) 117, and a hard disk unit 119. A scanner controller 21 is connected to scanner IF 115 and a printer controller 31 is connected to printer IF 117.

Network IF 123 is connected to the network to connect MFP 1 to any other computer through the network. Network IF 123 sends data input from CPU 101 to the network and outputs data received from the network to CPU 101.

Image controller 110 is controlled by CPU 101 for controlling an input/output of image data. Image controller 110 also outputs image data received from another computer through network IF 123, image data input from scanner IF, or image data read from the hard disk to printer controller 31 or hard disk unit 119. Image controller 110 also performs processing of converting the image data to print data that can be printed in printer unit 12 when outputting the image data to printer controller 31.

Binarization processing circuit 112 is controlled by CPU 101 for binarizing a character region representing a character according to a prescribed algorithm for input image data, and outputting binarized data. The processing according to a prescribed algorithm may be a well-known algorithm as long as binarized data generated by binarizing data in a region representing a character of image data is output. A prescribed algorithm includes processing of identifying an attribute of a pixel, an edge enhancement processing, and the like.

Binarization processing circuit 112 is configured with hardware since its processing speed needs to be high. Binarization processing circuit 112 has a nonvolatile memory as a work area to which image data is partially input. Image data that can be stored in RAM is a few lines to a few tens of lines of the image data. Memory costs are thus reduced. The binarization processing executed in binarization processing circuit 112 may be processing of identifying whether or not each pixel has a character attribute and binarizing only a value of a pixel determined to have a character attribute, or processing of identifying whether or not each pixel has a character attribute and thereafter binarizing the values of all the pixels included in a character region of a circumscribed rectangle of the pixels determined to have a character attribute.

Operation panel 122 includes an input unit for receiving an input of an operation from the user and a display unit for displaying information.

Hard disk unit 119 stores data input to MFP 1 such as image data read by the scanner and compressed data generated by compressing and encoding the image data, as well as image data received from another computer at network IF 123 and compressed data of the image data.

Flash ROM 126 is attached to memory IF 125. An image processing program stored in this flash ROM 126 is executed by CPU 101. It is noted that the program may be stored in an EEPROM (Electrically Erasable/Programmable Read Only Memory) in place of being read from flash ROM 126. CPU 101 executes the program stored in EEPROM. Since EEPROM allows stored contents to be rewritten or additionally written, another computer connected to the network may rewrite the program stored in EEPROM of MFP 1 or additionally write a new program. Alternatively, MFP 1 may download a program from another computer connected to the network and store the program in EEPROM.

The network may be a Local Area Network (LAN) or may be the internet or a general public network, either wired or wireless.

It is noted that, in this specification, the image processing program executed in MFP 1 is stored and distributed in flash ROM 126 by way of example, although it may be stored and distributed in any other recording medium, for example, a flexible disk, a cassette tape, a CD-ROM (Compact Disk-Read Only Memory), a hard disk, an optical disk (MO (Magnetic Optical Disk)/MD (Mini Disk)/DVD (Digital Versatile Disk)), an IC card (including a memory card), an optical card, or a medium fixedly carrying a program such as a semiconductor memory including a mask ROM, an EPROM, and an EEPROM. The program may be downloaded from another device through the network and executed in MFP 1.

The program referred to herein includes not only a program directly executable by CPU 101 but also a program in the form of a source program, a compressed program, an encrypted program, and the like.

NFP 1 in the present embodiment executes a process of encoding and compressing image data. The image data to be compressed includes image data read by scanner unit 11, image data received from another computer at network IF 123, image data read from hard disk unit 119, and also image data in full color and multivalued image data in monochrome.

A compression format includes a general compression format such as PDF (Portable Document Format), JPEG (Joint Photographic Experts Group), Flate compression, and a compression format defined by G4 standards for use in facsimile communications. Which of multiple compression formats is selected is decided by the user inputting an instruction to select a compression format using a selection screen displayed on operation panel 122. The compression data as compressed in CPU 101 is stored in a prescribed region of hard disk unit 119. A character region of image data has image quality improved when it is binarized and then compressed and encoded, thereby increasing compression efficiency. Therefore, CPU 101 extracts and compresses only a character region of image data. CPU 101 allows binarization processing circuit 112 to execute a process of extracting a character region from image data for binarization in order to execute the compression processing at high speed.

Binarization processing circuit 112 has a limited memory capacity that can be used as a work area, as described above, so that a precision in identification of a character region is limited. Since the memory capacity for the work area is limited, a part of image data is to be processed. Image data that can be stored in binarization processing circuit 112 is a few to a few tens of lines of the image data, and a part of image data to be processed is called band data.

The binarization processing executed in binarization processing circuit 112 includes a process of extracting a character region for each band data. For example, when a character region is divided into two band data, the region may be identified as a character in one band data while the region that should be identified as a character may sometimes be identified mistakenly as a photograph in the other band data. Mistaken identification often takes place when the other band data includes a photograph adjacent to the character. Alternatively, mistaken identification often takes place when one character is divided into two band data. If an attribute of a pixel is mistakenly identified, the pixel is not binarized, causing a character to be chipped or fade.

A function of CPU 101 in the present embodiment will now be described.

Figure 3:
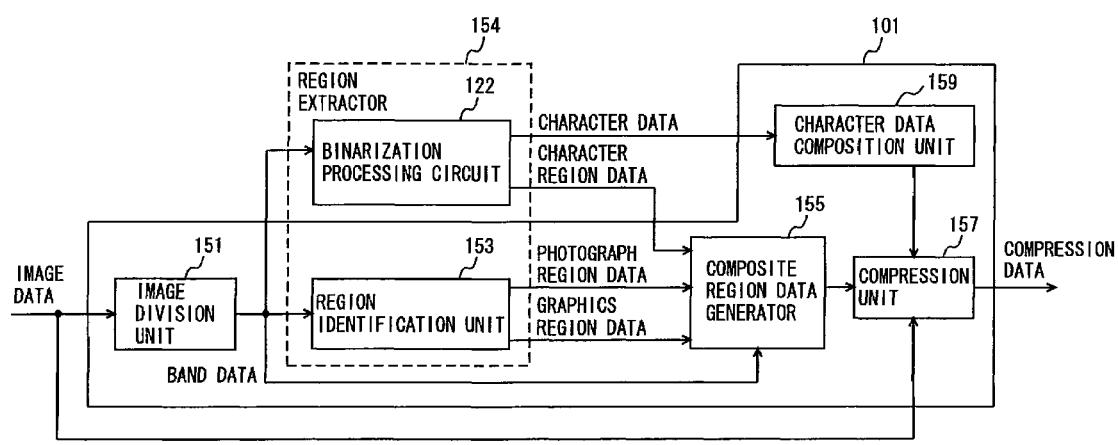
FIG. 3 is a functional block diagram showing a function of CPU (Central Processing Unit) in FIG. 2.

Referring to FIG. 3, CPU 101 includes an image division unit 151 dividing image data into a plurality of band data, a region identification unit 153 successively receiving band data for extracting a region with a photograph attribute or a character attribute for each band data, a composite region data generator 155, a character data composition unit 159, and a compression unit 157 compressing and encoding image data.

Image division unit 151 receives image data for dividing the received image data into band data. The band data divided by image division unit 151 has a prescribed overlap region with band data adjacent thereto. The size of band data may be defined beforehand or may be defined according to the amount of data that can be processed in binarization processing circuit 112. The band data is output to binarization processing circuit 112, region identification unit 153, and composite region data generator 155. The band data is stored in RAM 107 together with its order and read by binarization processing circuit 112, region identification unit 153, and composite region data generator 155.

Here, the band data will be described.

FIG. 4 shows an example in which image data 200 is divided into three pieces of band data 201A, 201B, 201C. Referring to FIG. 4, the lower portion of band data 201A overlaps with the upper portion of band data 201B. In other words, band data 201A, 201B each have a common overlap region. The lower portion of band data 201B overlaps with the upper portion of band data 201C. In other words, band data 201B, 201C each have a common overlap region.

Image data 200 includes a character region representing a character and a photograph region representing a photograph.

In FIG. 4, a character is indicated by a sign X and a photograph is indicated by a circle. In the following, for the sake of illustration, band data 201A is referred to as the first band data, band data 201B is referred to as the second band data, and band data 201C is referred to as the third band data.

Returning to FIG. 3, region identification unit 153 extracts a region having a photograph attribute and a region having a graphics attribute from band data, and then outputs photograph region data indicating the position in band data and the size of the region having a photograph attribute and graphics region data indicating the position in band data and the size of the region having a graphics attribute, to composite region data generator 155. The photograph region data has the same size as the band data, where the value of a pixel having a photograph attribute is set to "1" and the values of other pixels are set to "0". Furthermore, the photograph region data has the same size as the graphics region data and the band data, where the value of a pixel having a graphics attribute is set to "1" and the values of other pixels are set to "0". The photograph region data and the graphics region data are stored in RAM 107 together with their orders and read by composite region data generator 155.

In the following, for the sake of illustration, photograph region data corresponding to the first, second and third band data are referred to as first, second, and third photograph region data, and graphics region data corresponding to the first, second and third band data are referred to as first, second and third graphics region data.

It is noted that region identification unit 153 and binarization processing circuit 122 constitute a region extractor 154. Alternatively, CPU 101 may execute the processing of binarizing band data without providing binarization processing circuit 112. In this case, region identification unit 153 extracts a region having a character attribute in addition to extracting a region having a photograph attribute and a region having a graphics attribute, and also outputs character region data indicating the position in band data and the size of a region having a character attribute in addition to outputting the photograph region data indicating the position in band data and the size of a region having a photograph attribute and the graphics region data indicating the position in band data and the size of a region having a graphics attribute.

Composite region data generator 155 receives character region data, photograph region data, and graphics region data. The character region data output by binarization processing circuit 112 has the same size as band data, where the value of a pixel having a character attribute is set to "1" and the values of other pixels are set to "0". The character region data is output from binarization processing circuit 112, stored in RAM 107, and read by composite region data generator 155.

In the following, for the sake of illustration, the character region data corresponding to the first, second and third band data will be referred to as first, second and third character region data.

A configuration of composite region data generator 155 will now be described.

Figure 5:
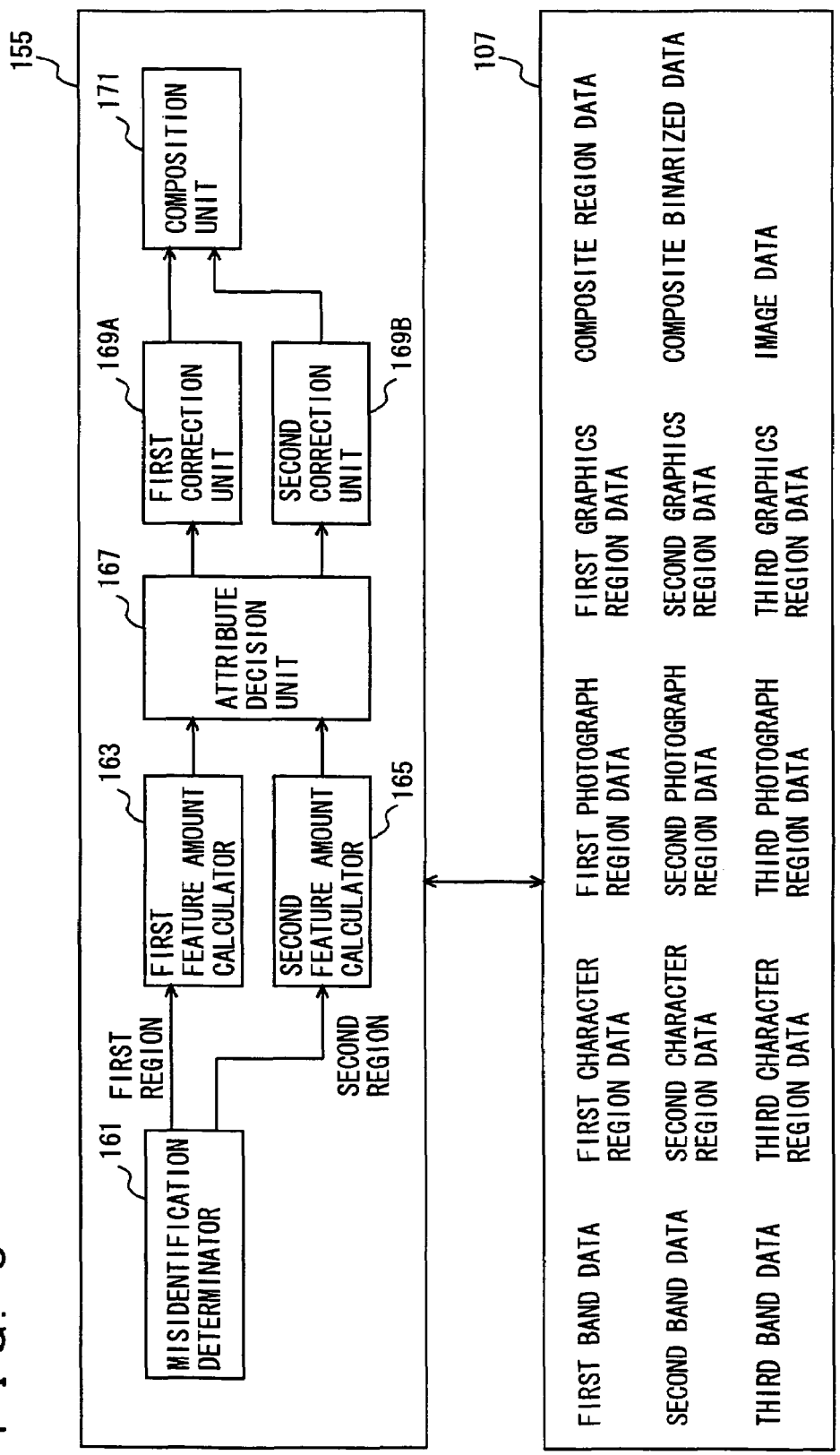
FIG. 5 is a block diagram showing a detailed configuration of a composite region data generator.

Referring to FIG. 5, composite region data generator 155 includes: a misidentification determinator 161 for extracting a first region and a second region in which attribute identification is mistaken; a first feature amount calculator 163 calculating a first feature amount from the first region; a second feature amount calculator 165 calculating a second feature amount from the second region; an attribute decision unit 167 deciding an attribute from the first feature amount and the second feature amount; a first correction unit 169A and a second correction unit 169B correcting character region data, photograph region data, and graphics region data according to the decided attribute; and a composition unit 171 generating composite region data by composing the corrected character region data, photograph region data, and graphics region data.

Here, for the sake of illustration, the processing executed on the first band data and the second band data will be described. The similar processing is executed on the second band data and the third band data, and therefore the description will not be repeated herein.

Misidentification determinator 161 extracts a misidentified region determined to have a different attribute in the overlap region between first band data 201A and second band data 201B. Specifically, the following cases are assumed.

(1) A pixel having a pixel value of "1" in the overlap region of the first character region data takes a pixel value of "1" in the second photograph region data or takes a pixel value of "1" in the second graphics region data, that pixel is extracted as a pixel included in a misidentified region. Then, a character region including the misidentified region extracted from the first character region data is output as the first region to first feature amount calculator 163, and a photograph region or a graphics region including the misidentified region extracted from the second photograph region data or the second graphics region data is output as the second region to second feature amount calculator 165.

(2) When a pixel having a pixel value of "1" in the overlap region of the first photograph region data has a pixel value of "1" in the second character region data or has a pixel value of "1" in the second graphics region data, that pixel is extracted as a pixel included in a misidentified region. Then, a photograph region including the misidentified region extracted from the first photograph region data is output as the first region to first feature amount calculator 163, and a character region or a graphics region including the misidentified region extracted from the second character region data or the second graphics region data is output as the second region to second feature amount calculator 165.

(3) When a pixel having a pixel value of "1" in the overlap region of the first graphics region data has a pixel value of "1" in the second character region data or a pixel value of "1" in the second photograph region data, that pixel is extracted as a pixel included in a misidentified region. Then, a graphics region including the misidentified region extracted from the first graphics region data is output as the first region to first feature amount calculator 163, and a character region or a photograph region including the misidentified region extracted from the second character region data or the second photograph region data is output as the second region to second feature amount calculator 165.

Returning to FIG. 5, first feature amount calculator 163 receives the first region and reads the first band data from RAM 107. First feature amount calculator 163 calculates a first feature amount from the values of the pixels included in the first region of the first band data and outputs the same to attribute decision unit 167. First feature amount calculator 163 creates a histogram of brightness values of the pixels included in the first region of the first band data and compares the number of peak values of the created histogram with a threshold value. Then, first feature amount calculator 163 determines from the property of the image that a region having a small number of peak values has a photograph attribute, that a region having a medium number of peak values has a graphics attribute, and that a region having a great number of peak values has a character attribute.

Second feature amount calculator 165 receives the second region and reads the second band data from RAM 107. Second feature amount calculator 165 calculates a second feature amount from the values of the pixels included in the second region of the second band data and outputs the same to attribute decision unit 167.

Attribute decision unit 167 decides which of the attribute of the first region and the attribute of the second region is to be used to correct an attribute as described later, based on the first feature amount and the second feature amount. This decision method will be described later.

When the attribute decided at attribute decision unit 167 differs from the attribute of the first region, first correction unit 169A corrects the attribute of the first region to the decided attribute. Specifically, the following processing is performed.

(1) In the case where the first region has a character attribute and the decided attribute is a photograph attribute. The value of a pixel included in the first region of the first character region data is set to "0" and the value of a pixel included in the first region of the first photograph region data is set to "1". In the case where the first region has a character attribute and the decided attribute is a graphics attribute. The value of a pixel included in the first region of the first character region data is set to "0" and the value of a pixel included in the first region of the first graphics region data is set to "1".

(2) In the case where the first region has a photograph attribute and the decided attribute is a character attribute. The value of a pixel included in the first region of the first photograph region data is set to "0" and the value of a pixel included in the first region of the first character region data is set to "1". In the case where the first region has a photograph attribute and the decided attribute is a graphics attribute. The value of a pixel included in the first region of the first photograph region data is set to "0" and the value of a pixel included in the first region of the first graphics region data is set to "1".

(3) In the case where the first region has a graphics attribute and the decided attribute is a character attribute. The value of a pixel included in the first region of the first graphics region data is set to "0" and the value of a pixel included in the first region of the first character region data is set to "1". In the case where the first region has a graphics attribute and the decided attribute is a photograph attribute. The value of a pixel included in the first region of the first graphics region data is set to "0" and the value of a pixel included in the first region of the first photograph region data is set to "1".

When the attribute decided at attribute decision unit 167 differs from the attribute of the second region, second correction unit 169B corrects the attribute of the second region to the decided attribute. Specifically, the following processing is performed.

(1) In the case where the second region has a character attribute and the decided attribute is a photograph attribute. The value of a pixel included in the second region of the second character region data is set to "0" and the value of a pixel included in the second region of the second photograph region data is set to "1". In the case where the second region has a character attribute and the decided attribute is a graphics attribute. The value of a pixel included in the second region of the second character region data is set to "0" and the value of a pixel included in the second region of the second graphics region data is set to "1".

(2) In the case where the second region has a photograph attribute and the decided attribute is a character attribute. The value of a pixel included in the second region of the second photograph region data is set to "0" and the value of a pixel included in the second region of the second character region data is set to "1". In the case where the second region has a photograph attribute and the decided attribute is a graphics attribute. The value of a pixel included in the second region of the second photograph region data is set to "0" and the value of a pixel included in the second region of the second graphics region data is set to "1".

(3) In the case where the second region has a graphics attribute and the decided attribute is a character attribute. The value of a pixel included in the second region of the second graphics region data is set to "0" and the value of a pixel included in the second region of the second character region data is set to "1". In the case where the second region has a graphics attribute and the decided attribute is a photograph attribute. The value of a pixel included in the second region of the second graphics region data is set to "0" and the value of a pixel included in the second region of the second photograph region data is set to "1".

When the processing is performed on all the first band data to the third band data as described above, the first to third band data, the first to third character region data, the first to third photograph region data, and the first to third graphics region data are stored in RAM 107.

Composition unit 171 reads the first to third character region data, the first to third photograph region data, and the first to third graphics region data from RAM to generate composite region data in which all of these data are combined. In the composite region data, for example, the value of a pixel included in the character region is set to "1", the value of a pixel included in the photograph region is set to "2", and the value of a pixel included in the graphics region is set to "3".

Returning to FIG. 3, character data composition unit 159 receives character data from binarization processing circuit 112. The character data is created by binarizing the character region and has the same size as the band data. Character data composition unit 159 combines the character data in the order of reception and stores the composite binarized data in RAM 107. Here, as for the overlap region, data received later is given a high priority. The composite binarized data has the same size as the image data.

Character data composition unit 159 changes the pixel value of the pixel, of which pixel value included in the composite binarized data is "1" and which is not assumed as a character attribute in the composite region data, to "0". In addition, character data composition unit 159 extracts a pixel group including a pixel of which pixel value included in the composite binarized data is "0" and which is assumed as a character attribute in the composite region data, and changes the band data into binarized values through binarization for the region forming such a pixel group.

Compression unit 157 reads image data, composite region data, and composite binarized data from RAM 107 for encoding and compression for each region. Referring to the composite region data, a plurality of regions are successively specified, and each compressed and encoded in a compression format according to the attribute with a compression parameter being set according to the attribute. For example, as for the character region having an attribute of character, the binarized data of the character region corresponding to composite binarized data is compressed and encoded in G4 compression format. As for the photograph region having an attribute of photograph, the data of the photograph region corresponding to image data is compressed and encoded in JPEG compression format. As for the graphics region having an attribute of graphics, the data of the graphics region corresponding to image data is compressed and encoded in Flate compression format.

Then, the data compressed and encoded for each region are combined as one compression data, which is then stored in RAM 107. The compression data includes the compression format of the data compressed for each region and the positional information in the image data.

Now, referring to FIGS. 6A and 6B, the processing of deciding an attribute in attribute decision unit 167 will be described.

Figures 6A, 6B, 7, 8:
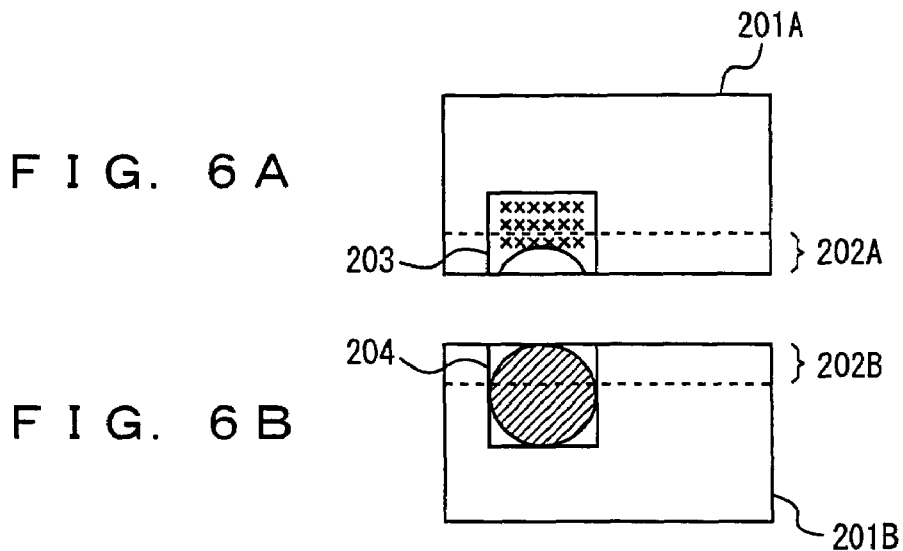
FIG. 6A is a diagram showing exemplary first band data processed in MFP in FIG. 1.
FIG. 6B is a diagram showing exemplary second band data processed in MFP in FIG. 1.
FIG. 7 is an exemplary first weighting coefficient table used in the processing in MFP in FIG. 1.
FIG. 8 is an exemplary second weighting coefficient table.

Referring to FIG. 6A, first band data 201A includes overlap region 202A common to second band data 201B. First band data 201A includes a character region representing a character and a part of a photograph region representing a photograph. In first band data 201A, the photograph region is located in the vicinity of the character region and has an area smaller than that of the character region. When first band data 201A is binarized by binarization processing circuit 112, the photograph region may be mistakenly identified as a character region. FIG. 6A shows character region 203 that is mistakenly identified. In other words, in the example shown in FIG. 6A, a part of the photograph region is mistakenly included in the character region.

Referring to FIG. 6B, second band data 201B includes overlap region 202B common to first band data 201A. Second band data 201B includes the entire region of the photograph region representing a photograph.

Exemplary processing for first and second band data 201A and 201B shown in FIGS. 6A and 6B will be described specifically.

Upon an input of first band data 201A, binarization processing circuit 112 outputs character region data in which the value of a pixel included in character region 203 is set to "1" and the values of other pixels are set to "0". Upon an input of first band data 201A, region identification unit 153 outputs photograph region data and. graphics region data in which the values of all the pixels are set to "0".

Upon an input of second band data 201B, binarization processing circuit 112 outputs character region data in which the values of all the pixels are set to "0", without identifying the photograph region as a character region. Upon an input of second band data 201B, region identification unit 153 outputs photograph region data in which the value of a pixel included in photograph region 204 is set to "1" and the values of other pixels are set to "0" as well as graphics region data in which the values of all the pixels are set to "0".

Misidentification determinator 161 compares the first character region data and the second photograph region data between overlap region 202A of first band data 201A and overlap region 202B of second band data 201B to extract as a misidentified region a region in which character region 203 and photograph region 204 overlap with each other. Then, misidentification determinator 161 extracts character region 203 including the misidentified region as the first region from the first character region data and extracts photograph region 204 including the misidentified region as the second region from the second photograph region data.

First feature amount calculator 163 calculates a feature amount from the values of the pixels included in character region 203 of first band data 201A. Second feature amount calculator 165 calculates a feature amount from the values of the pixels included in photograph region 204 of second band data 201B.

Here, a feature amount will be described.

A feature amount F is calculated from the values of pixels included in a region. The feature amount is obtained by a histogram of brightness values of pixels included in a region. Therefore, characters, photographs, and graphics can be identified separately by one feature amount. Feature amount F can be obtained by the following formula (1) where the width of the histogram is n, and the frequency of pixels having brightness value i is h[i].

$$F = \sum_{i=1}^{n-1} \left| h[i] - \frac{h[i-1] + h[i+1]}{2} \right| / \sum_{i=1}^{n} h[i] \quad (1)$$

This feature amount has a smaller value as the number of peaks in the histogram becomes greater. Since the photograph region has a gradual slope in the histogram as the property of the image, the number of peak values is small. The character region has one peak value in the histogram. The graphics region has a plurality of peak values. Therefore, with two threshold values being set, the attributes of character, graphics and photograph can be determined from the feature amount.

The feature amount is the inverse of the proportion of peak value ch1. Therefore, the feature amount has a value which becomes smaller in the order of a region with a character attribute, a region with a graphics attribute, and a region with a photograph attribute.

Here, the feature amount of character region 203 of first band data 201A that is calculated by first feature amount calculator 163 is assumed as F1, and the feature amount of photograph region 204 of second band data 201B that is calculated by second feature amount calculator 165 is assumed as F2.

Attribute decision unit 167 obtains evaluation value E using the formula (2) based on the feature amounts F1, F2, a first weighting coefficient Coef (attribute), and a second weighting coefficient Weight (attribute, overlapping width). First weighting coefficient Coef (attribute) is a coefficient defined beforehand according to the attribute of a region. Second weighting coefficient Weight (attribute, overlapping width) is a coefficient defined beforehand according the attribute of a region and the width (the number of lines) of an overlap region.

$E = F1 \times Coef(\text{character}) \times \text{Weight (character, small)} + F2 \times Coef(\text{photograph}) \times \text{Weight (photograph, small)}$ (2)

Attribute decision unit 167 sets a determination result as a photograph attribute when evaluation value E is greater than threshold value T defined beforehand, and it sets a determination result as a character attribute when evaluation value E is equal to or smaller than threshold value T. Although character region 203 having a character attribute and photograph region 204 having a photograph attribute have been illustrated here by way of example, in a combination of regions having other attributes, an attribute can also be decided similarly by obtaining feature amount F using formula (1), obtaining evaluation value E from the feature amount using formula (2), and comparing evaluation value E with threshold value E. At that point, an attribute may be decided in the order of a photograph attribute, a graphics attribute, and a character attribute as evaluation value E is greater. More specifically, in the combination of a region having a photograph attribute and a region having a graphics attribute, when evaluation value E is greater than threshold value T, a photograph attribute is decided on, and when evaluation value E is smaller than threshold value T, a graphics attribute is decided on. In the combination of a region having a graphics attribute and a region having a character attribute, when evaluation value E is greater than threshold value T, a graphics attribute is decided on, and when evaluation value E is smaller than threshold value T, a character attribute is decided on.

(1) In the case where attribute decision unit 167 decides on a photograph attribute.

The attribute of the first region (character region) of the first band data differs from the attribute decided by attribute decision unit 167. In this case, first correction unit 169A replaces all the values of the pixels included in the first region of the first character region data with "0" and replaces all the values of the pixels included in the first region of the first photograph region data with "1". Second correction unit 169B does nothing.

(2) In the case where attribute decision unit 167 decides on a character attribute.

The attribute of the second region (photograph region) of the second band data differs from the attribute decided by attribute decision unit 167. In this case, first correction unit 169A does nothing, while second correction unit 169B replaces all the values of the pixels included in the second region of the second photograph region data with "0".

A first weighting coefficient table will now be described.

The first weighting coefficient table is read together with a program from flash ROM 126 to be stored in RAM 107 and read to CPU 101 at a necessary timing.

Referring to FIG. 7, the first weighting coefficient table defines first weighting coefficient Coef for each attribute. In other words, first weighting coefficient Coef assumes different values according to attributes. In FIG. 7, first weighting coefficient Coef is defined as a value "100" for a photograph attribute, defined as a value "1" for a graphics attribute, and defined as a value "10" for a character attribute.

First weighting coefficient Coef takes on the greatest value corresponding to a photograph attribute, the second greatest value corresponding to a character attribute, and the smallest value corresponding to a graphics attribute. In a region having a photograph attribute, as a divided region becomes smaller, a precision in determination of an attribute becomes lower. Therefore, a weighting coefficient having a great value is defined for a photograph attribute.

A second weighting coefficient table will now be described.

The second weighting coefficient table is read together with a program from flash ROM 126 to be stored in RAM 107 and read to CPU 101 at a necessary timing.

Referring to FIG. 8, the second weighting coefficient table defines second weighting coefficient Weight for each attribute and for each overlapping width. In other words, second weighting coefficient Weight assumes a value defined according to an attribute and an overlapping width. The overlapping width is a width (the number of lines) of an overlap region. In FIG. 8, when the overlapping width is small, second weighting coefficient Weight is defined as the same value "1" for all of the photograph attribute, the graphics attribute, and the character attribute. When the overlapping width is great, second weighting coefficient Weight is defined as the value "0.2" for the photograph attribute, defined as the value "1" for the graphics attribute, and defined as the value "0.2" for the character attribute.

As described above, when the overlapping width is fixed to a small value, second weighting coefficient Weight assumes a fixed value "1" irrespective of the attribute. It follows that the evaluation value is defined by the feature amount and the first weighting coefficient defined by the attribute. Where the overlapping width is small, the number of lines is, for example, a few to 20. Where the overlapping width is great, the number of lines is greater than that of the small overlapping width, for example, more than 20.

As the overlapping width is greater, it is more likely that a region divided into two adjacent band data (here, the first band data and the second band data) is included to a large extent in each band data. Therefore, when the overlapping width is great, it is more likely that the attribute of a region can be determined accurately as compared with the case where the overlapping width is small. In the example shown in FIG. 8, second weighting coefficient Weight for the photograph attribute and the character attribute is defined as the value "1" for the small overlapping width and defined as the value "0.2" for the large overlapping width. In other words, the larger the overlapping width is, the smaller value second weighting coefficient Weight assumes.

Here, the second weighting coefficient is fixedly defined beforehand for each of the large overlapping width and the small overlapping width. However, the second weighting coefficient may be defined by the overlapping width and the width of the region.

(1) When the width of the region is smaller than the overlapping width, the second weighting coefficient is set to "2".

(2) When the width Ah of the region is equal to or larger than overlapping width Bh and smaller than ten times overlapping width Bh, the second weighting coefficient is defined based on the following formula.

Weight=$Ah/Bh$+1

(3) When the width of the region exceeds ten times the overlapping width, the second weighting coefficient is set to "1".

It is noted that as the overlapping width is smaller, it is more likely that a region divided into two adjacent band data (here, the first band data and the second band data) is included in each band data as a small region. Therefore, as the overlapping width is smaller, the second weighting coefficient is set to a larger value. Accordingly, even when the divided region is small, the feature amount thereof can have a great effect on evaluation value E. This facilitates determination as a photograph.

A region having a photograph attribute is less likely to be determined as a photograph attribute when a region is divided to become smaller. When the photograph region is mistakenly determined to have a character attribute, the photograph region is binarized, thereby significantly degrading the image quality. Therefore, the degradation in image quality after compression can be prevented by facilitating determining the photograph region to have a photograph attribute even when the width of the overlap region is small. Even if the character region is mistakenly determined to have photograph attribute, degradation in image quality is less than when the photograph region is binarized.

The image processing executed in CPU 101 of MFP 1 will now be described.

Figure 9:
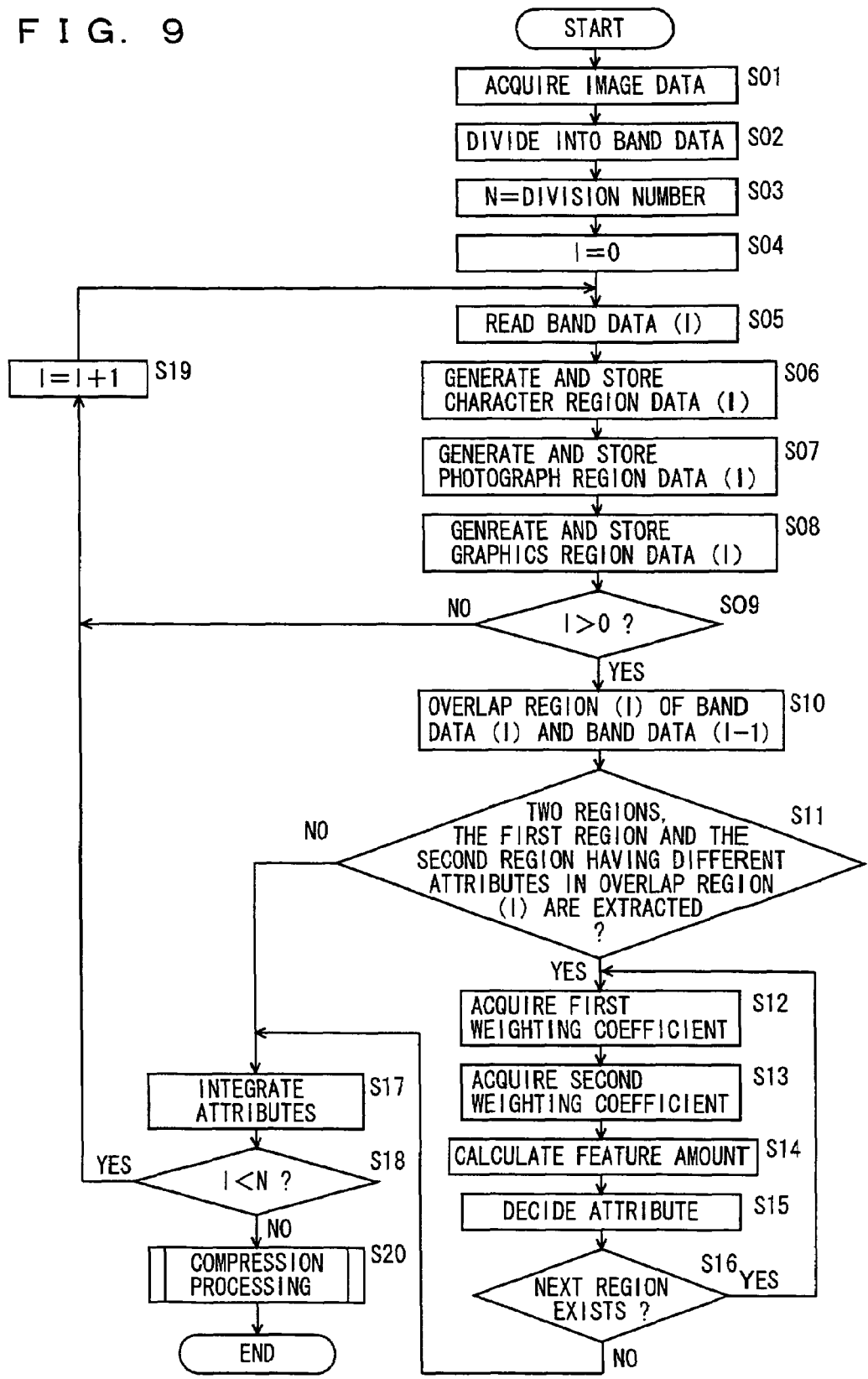
FIG. 9 is a flowchart showing a flow of image processing executed in CPU of MFP in FIG. 1.

Referring to FIG. 9, first, image data is acquired (step S01). The acquired image data is temporarily stored in RAM 107.

Then, the image data is divided into band data (step S02). The band data has a prescribed overlap region with the adjacent band data. The size of band data may be defined beforehand or may be defined according to the amount of data that can be processed by binarization processing circuit 112. The divided band data is given a number for identifying the band data and stored in RAM 107. Successive numbers are assigned to adjacent band data in the order of division.

Then, the total number of the divided band data is counted (step S03), and "0" is set to a variable I (step S04). Variable I is a variable for specifying band data. Here, the I-th band data is represented as band data (I).

Next, band data (I) is read from RAM 107 (step S05). Then, character region data (I) corresponding to band data (I) input from binarization processing circuit 112 is stored in RAM 107 (step S06). It is noted that the binarization processing may be executed in CPU 101 without providing binarization processing circuit 112. In that case, CPU 101 extracts a character region from band data (I), generates character region data (I) to be stored in RAM 107, where the value of a pixel included in the character region of the band data is set to "1" and the values of pixels included in other regions are set to "0".

Then, a photograph region is extracted from band data (I), photograph region data (I) is generated, where the value of a pixel included in the photograph region of the band data is set to "1" and the values of pixels included in other regions are set to "0", and photograph region data (I) is then stored in RAM 107 (step S07). Furthermore, a graphics region is extracted from band data (I), graphics region data (I) is generated, where the value of a pixel included in the graphics region of the band data is set to "1" and the values of pixels included in other regions are set to "0". Graphics region data (I) is then stored in RAM 107 (step S08).

At step S09, it is determined whether or not variable I is greater than 0, if greater, the process goes to step S10, and if not, the process goes to step S19.

At step S19, 1 is added to variable I, and the process goes to step S05. If variable I is 0, the process goes to step S19. On the other hand, if variable I is 1 or greater, the process goes to step S10. In MFP 1 in the present embodiment, for comparison of the overlap region between two band data, if variable I is "1" or greater, character region data, photograph region data, and graphics region data of at least two band data are stored in RAM 107. Therefore, if variable I is "1" or greater, the processing after step S10 for comparing the overlap region between two band data is executable.

At step S10, overlap region (I) of band data (I) and band data (I−1) adjacent thereto that is previously stored in RAM 107 is specified. Then, at step S11, overlap region (I) of band data (I) and overlap region (I) of band data (I−1) are compared with each other, and it is determined whether or not the first region and the second region including a misidentified region formed of a pixel determined to have a different attribute are each extracted. If extracted, the process goes to step S12, and if not, the process goes to step S17. If there is no misidentified region formed of a pixel determined to have a different attribute, the attribute identification result in band data (I−1) agrees with the attribute identification result in band data (I) in the overlap regions. In this case, there is no need for changing the attribute. It is noted that the first region is information indicative of the position and size in band data (I−1). The second region is information indicative of the position and size in band data (I).

The first region and the second region extracted at step S10 are as follows.

(1) When the misidentified region of band data (I−1) has a character attribute, the character region including the misidentified region is extracted from character region data (I−1) as the first region. The character region is a rectangular region circumscribing pixels having a pixel value of "1" in character region data (I−1). When the misidentified region of band data (I−1) has a photograph attribute, the photograph region including the misidentified region is extracted from photograph region data (I−1) as the first region. The photograph region is a rectangular region circumscribing pixels having a pixel value of "1" in photograph region data (I−1). When the misidentified region of band data (I−1) has a graphics attribute, the graphics region including the misidentified region is extracted from graphics region data (I−1) as the first region. The graphics region is a rectangular region circumscribing pixels having a pixel value of "1" in graphics region data (I−1).

(2) When the misidentified region of band data (I) has a character attribute, the character region including the misidentified region is extracted from character region data (I) as the second region. The character region is a rectangular region circumscribing pixels having a pixel value of "1" in character region data (I). When the misidentified region of band data (I) has a photograph attribute, the photograph region including the misidentified region is extracted from photograph region data (I) as the second region. The photograph region is a rectangular region circumscribing pixels having a pixel value of "1" in photograph region data (I). When the misidentified region of band data (I) has a graphics attribute, the graphics region including the misidentified region is extracted from graphics region data (I) as the second region. The graphics region is a rectangular region circumscribing pixels having a pixel value of "1" in graphics region data (I).

At step S12, the first weighting coefficient is acquired. The first weighting coefficient for each of the first region and the second region is acquired. This is because, as shown in FIG. 7, the first weighting coefficient is a value defined according to an attribute.

At step S13, the second weighting coefficient is acquired. The second weighting coefficient for each of the first region and the second region is acquired. This is because, as shown in FIG. 8, the second weighting coefficient is a value defined according to an attribute.

Then, feature amounts F1, F2 of the first region and the second region are calculated using formula (1) (step S14). Then, an attribute is decided from evaluation value E calculated using formula (2) and threshold value T (step S15).

At the next step S16, if a plural pairs of the first region and the second region are extracted at step S11, it is determined whether or not there exists any pair to be processed subsequently. If there exists such a pair, the process returns to step S12, and the processing from step S12 to S15 is repeatedly executed until there exists none.

Then, an attribute of a region, which attribute is different from the attribute decided at step S15, of the first region of band data (I−1) and the second region of band data (I), is corrected to the attribute decided at step S15, so that the attribute is integrated (step S17). The integration of the attribute is performed by adding character region data (I), photograph region data (I), and graphics region data (I) to the composite region data stored in RAM 107. It is noted that when variable I is "1", no composite region data is stored in RAM 107. In that case, composite region data is generated by integrating character region data (I−1), photograph region data (I−1), graphics region data (I−1), character region data (I), photograph region data (I), and graphics region data (I), and is then stored in RAM 107. In the composite region data, for example, the value of a pixel included in the character region is set to "1", the value of a pixel included in the photograph region is set to "2", and the value of a pixel included in the graphics region is set to "3".

At the next step S18, it is determined whether or not variable I is smaller than a division number N (the number of band data), and if smaller, the process goes to step S19. On the other hand, if variable I is equal to or greater than division number N, the process goes to step S20.

At step S20, compression processing is executed.

The compression processing will now be described with reference to FIG. 10.

Figure 10:
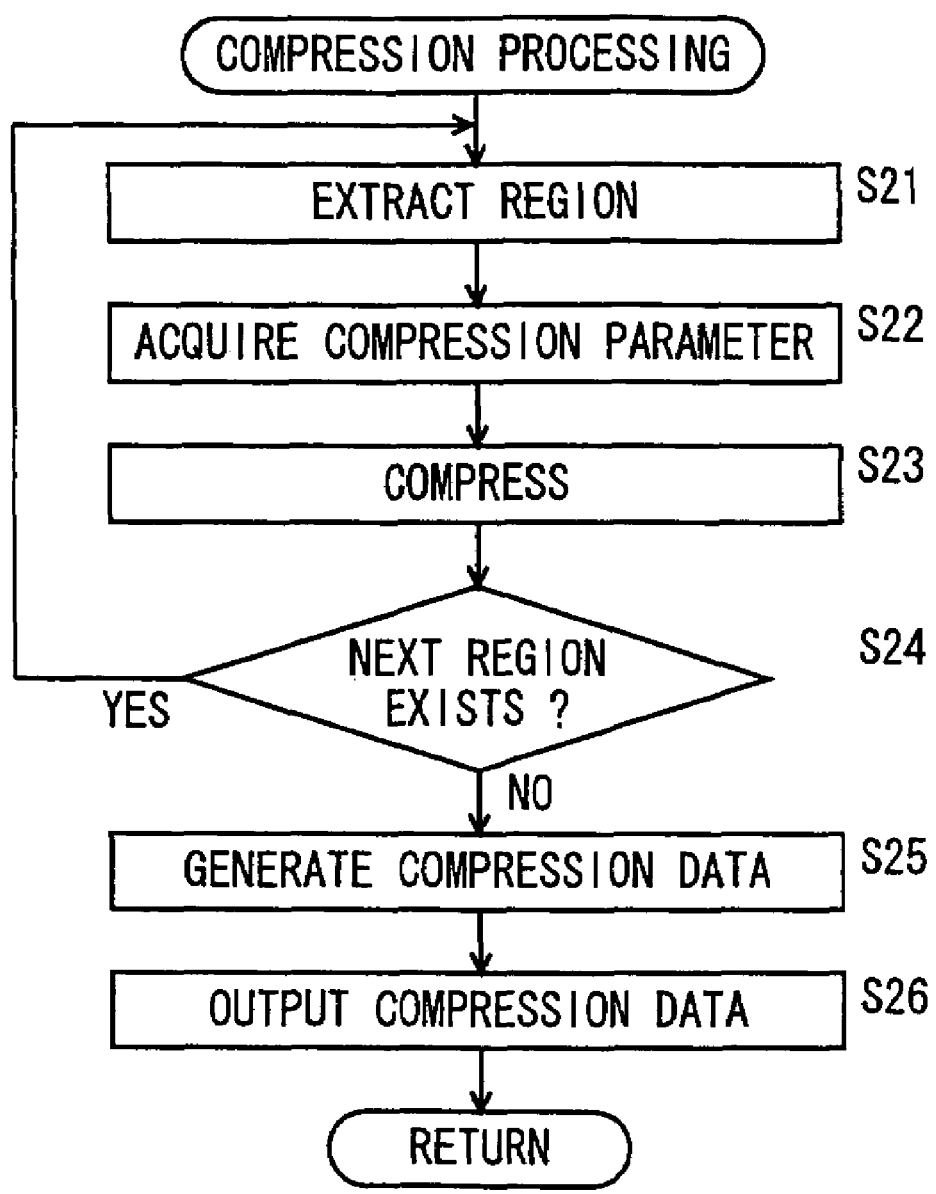
FIG. 10 is a flowchart of a subroutine of compression processing in FIG. 9.

Referring to FIG. 10, in the compression processing, first, a region is extracted from the composite region data (step S21). The region extracted here is a region each having a character attribute, a photograph attribute, and graphics attribute. When the composite region data includes a plurality of regions, any one of them is extracted. The order of extraction is arbitrary. As described above, in the compression processing, a compression format is selected according to an attribute. Therefore, a compression parameter defined by the compression format according to the attribute of the extracted region is acquired (step S22). The compression parameter is stored beforehand in ROM 105. Alternatively, it may be read from flash ROM 126 or input by the user through operation panel 122.

Then, that region of the image data which is extracted at step S21 is compressed in the compression format corresponding to the attribute of that region (step S23). The compression parameter acquired at step S22 is used as a compression parameter required in compression. Compression data compressed for each region of image data as extracted at step S21 is thus generated.

Then, it is determined whether or not there exists any region to be compressed in the composite region data (step S24), and if any, the process returns to step S21, and if not, the process goes to step S25.

At step S25, the compression data as compressed for each region are combined in one compression data so that a file is created. The created file includes information of the compression format of the data compressed for each region and the positional information in the image data.

Then, the compression data is output (step S26). The output may be such processing as storage into hard disk unit 119 or transmission by network IF 123 to any other computer through a network.

It is noted that although in MFP 1 in the present embodiment the attribute to be identified is character, photograph, and graphics, the present invention is not limited thereto and any other attributes may be identified.

As described above, MFP 1 in the present embodiment divides image data such that two adjacent band data has a common overlap region thereby to extract an attribute region. Therefore, the processing can be performed with a small memory capacity. In addition, it can be detected that the attribute regions overlapping in the overlap region are identified as having different attributes between two band data.

Moreover, when there is a misidentified region identified as having a different attribute between two band data in the overlap region, any one of the attribute of the first region and the attribute of the second region is decided based on the feature amount of each of the first region and the second region each including the misidentified region, so that the attribute of the first region and the attribute of the second region are made the same.

It is noted that although in the present embodiment MFP 1 has been illustrated, it is needless to say that the present invention can be understood as an image processing method or an image processing program for causing a computer to execute the processing shown in FIGS. 9 and 10.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing method comprising the steps of:
dividing image data into a plurality of bands in such a manner as to have an overlap region between each pair of adjacent bands, wherein said plurality of bands include a first band and a second band that are adjacent;

extracting regions, each with a different kind of attribute, from each of said plurality of bands;

extracting a first region from one of said regions extracted from said first band and extracting a second region from one of said regions extracted from said second band, wherein said first region and said second region at least partially overlap with each other in said overlap region between said first band and said second band and have attributes different from each other;

calculating a feature amount of extracted said first region;

calculating a feature amount of extracted said second region;

obtaining a decided attribute as either the attribute of said first region or the attribute of said second region for use in correction, based on said feature amount of said first region and said feature amount of said second region; and changing a designated attribute to said decided attribute if they are different, wherein said designated attribute is the attribute of said first region or the attribute of said second region, wherein the above steps are performed by a computer.

2. The image processing method according to claim 1, wherein said step of calculating a feature amount of the first region includes the step of generating a histogram based on values of pixels included in said first region calculates the feature amount of said first region based on the number of peak values of said histogram, and said step of calculating a feature amount of the second region includes the step of generating a histogram based on values of pixels included in said second region calculates the feature amount of said second region based on the number of peak values of said histogram.

3. The image processing method according to claim 1, wherein said step of deciding on any one of the attribute of said first region and the attribute of said second region further includes the step of multiplying each of said feature amount of said first region and said feature amount of said second region by a first weighting coefficient predetermined according to an attribute and comparing values resulting from the multiplication.

4. The image processing method according to claim 3, wherein at said step of comparing values, each of said feature amounts of said first region and said feature amounts of said second region is further multiplied by a second weighting coefficient predetermined according to an attribute and a width of the overlap region between said first region and said second region and comparing values resulting from the multiplication.

5. The image processing method according to claim 3, wherein said step of deciding on any one of the attributes of said first region and the attributes of said second region includes a step of deciding a third weighting coefficient according to a ratio between the widths of said first region and the overlap region between the first band and the second band, and a step of deciding a fourth weighting coefficient according to a ratio between the widths of said second region and said overlap region between the first band and the second band, and at said step of comparing values, a value obtained by further multiplying the feature amount of said first region by said third weighting coefficient is compared with a value obtained by further multiplying the feature amount of said second region by said fourth weighting coefficient.

6. The image processing method according to claim 1, further comprising:

a step of receiving said regions extracted from said plurality of bands and integrating two of the received regions that have the same attribute and overlap with each other in said overlap region between the first band and the second band; and a step of compressing and encoding each of a region integrated by said integration unit and a region that is not integrated by said integration unit of said image data in a compression format predetermined corresponding to their respective attribute.

7. An image processing device comprising:

a division unit dividing image data into a plurality of bands in such a manner as to have an overlap region between each pair of adjacent bands, wherein said plurality of bands include a first band and a second band that are adjacent;

a region identification unit extracting regions, each with a different kind of attribute, from each of said plurality of bands;

a region extractor extracting a first region from one of said regions extracted from said first band and extracting a second region from one of said regions extracted from said second band, wherein said first region and said second region at least partially overlap with each other in said overlap region between said first band and said second band and have attributes different from each other;

a first feature amount calculator calculating a feature amount of extracted said first region;

a second feature amount calculator calculating a feature amount of extracted said second region;

an attribute decision unit obtaining a decided attribute as either the attribute of said first region or the attribute of said second region for use in correction, based on said feature amount of said first region and said feature amount of said second region; and a correction unit changing a designated attribute to said decided attribute if they are different, wherein said designated attribute is the attribute of said first region or the attribute of said second region.

8. The image processing device according to claim 7, wherein said first feature amount calculator includes a first generator generating a histogram based on values of pixels included in said first region and calculates the feature amount of said first region based on the number of peak values of said histogram, and said second feature amount calculator includes a second generator generating a histogram based on values of pixels included in said second region and calculates the feature amount of said second region based on the number of peak values of said histogram.

9. The image processing device according to claim 7, wherein said attribute decision unit further includes a comparison unit multiplying each of said feature amount of said first region and said feature amount of said second region by a first weighting coefficient predetermined according to an attribute and comparing values resulting from the multiplication.

10. The image processing device according to claim 9, wherein said comparison unit further multiplies each of said feature amounts of said first region and said feature amounts of said second region by a second weighting coefficient predetermined according to an attribute and a width of the overlap region between said first region and said second region and comparing values resulting from the multiplication.

11. The image processing device according to claim 9, wherein said attribute decision unit includes a third weighting coefficient decision unit deciding a third weighting coefficient according to a ratio between the widths of said first region and the overlap region between the first band and the second band, and a fourth weighting coefficient decision unit deciding a fourth weighting coefficient according to a ratio between the widths of said second region and said overlap region between the first band and the second band, and said comparison unit compares a value obtained by further multiplying the feature amount of said first region by said third weighting coefficient with a value obtained by further multiplying the feature amount of said second region by said fourth weighting coefficient.

12. The image processing device according to claim 7, further comprising:

an integration unit receiving said regions extracted from said plurality of bands and integrating two of the received regions that have the same attribute and overlap with each other in said overlap region between the first band and the second band; and a compression unit compressing and encoding each of a region integrated by said integration unit and a region that is not integrated by said integration unit of said image data in a compression format predetermined corresponding to their respective attribute.

13. A computer readable medium storing a computer executable program for image processing, the program comprising program code for causing a computer to execute the steps of:

dividing image data into a plurality of bands in such a manner as to have an overlap region between each pair of adjacent bands, wherein said plurality of bands include a first band and a second band that are adjacent;

extracting regions, each with a different kind of attribute, from each of said plurality of bands;

extracting a first region from one of said regions extracted from said first band and extracting a second region from one of said regions extracted from said second band, wherein said first region and said second region at least partially overlap with each other in said overlap region between said first band and said second band and have attributes different from each other;

calculating a feature amount of extracted said first region;

calculating a feature amount of extracted said second region;

obtaining a decided attribute as either the attribute of said first region or the attribute of said second region for use in correction, based on said feature amount of said first region and said feature amount of said second region; and changing a designated attribute to said decided attribute if they are different, wherein said designated attribute is the attribute of said first region or the attribute of said second region.

14. The computer readable medium according to claim 1, wherein said step of calculating a feature amount of the first region causes said computer to execute the step of generating a histogram based on values of pixels included in said first region and calculates the feature amount of said first region based on the number of peak values of said histogram, and said step of calculating a feature amount of the second region causes said computer to execute the step of generating a histogram based on values of pixels included in said second region and calculates the feature amount of said second region based on the number of peak values of said histogram.

15. The computer readable medium according to claim 13, wherein said step of deciding on any one of the attribute of said first region and the attribute of said second region causes said computer to execute the step of multiplying each of said feature amount of said first region and said feature amount of said second region by a first weighting coefficient predetermined according to an attribute and comparing values resulting from the multiplication.

16. The computer readable medium according to claim 15, wherein said step of comparing values causes said computer to further multiply each of said feature amounts of said first region and said feature amounts of said second region by a second weighting coefficient predetermined according to an attribute and a width of the overlap region between said first region and said second region and comparing values resulting from the multiplication.

17. The computer readable medium according to claim 15, wherein said step of deciding on any one of the attributes of said first region and the attributes of said second region includes a step of deciding a third weighting coefficient according to a ratio between the widths of said first region and the overlap region between the first band and the second band, and a step of deciding a fourth weighting coefficient according to a ratio between the widths of said second region and said overlap region between the first band and the second band, and said step of comparing values causes said computer to further compare a value obtained by further multiplying the feature amount of said first region by said third weighting coefficient with a value obtained by further multiplying the feature amount of said second region by said fourth weighting coefficient.

18. The computer readable medium according to claim 13, further comprising computer code causing a computer to execute:

a step of receiving said regions extracted from said plurality of bands and integrating two of the received regions that have the same attribute and overlap with each other in said overlap region between the first band and the second band; and a step of compressing and encoding each of a region integrated by said integration unit and a region that is not integrated by said integration unit of said image data in a compression format predetermined corresponding to their respective attribute.

* * * * *

UNITED STATES PATENT AND TRADEMARK OFFICE
CERTIFICATE OF CORRECTION

| | | |
|---|---|---|
| PATENT NO. | : 7,529,419 B2 | Page 1 of 1 |
| APPLICATION NO. | : 11/305559 | |
| DATED | : May 5, 2009 | |
| INVENTOR(S) | : Hiroki Yoshida | |

It is certified that error appears in the above-identified patent and that said Letters Patent is hereby corrected as shown below:

<u>Column 22</u>:
line 1, delete "claim 1," and
       insert -- claim 13, --.

Signed and Sealed this

Ninth Day of June, 2009

JOHN DOLL
*Acting Director of the United States Patent and Trademark Office*